United States Patent Office 3,287,463
Patented Nov. 22, 1966

3,287,463
CERTAIN 3-CHLOROMETHYL- AND 3-PHENYL-1,3,4-THIADIAZOLES
Kurt Rufenacht, Basel, Switzerland, assignor to
J. R. Geigy A.-G., Basel, Switzerland
No Drawing. Filed Sept. 27, 1963, Ser. No. 311,952
Claims priority, application Switzerland, Oct. 4, 1962,
11,656/62
3 Claims. (Cl. 260—302)

The present invention relates to new thiadiazole derivatives, to the preparation thereof, and to nematocidally active compositions for controlling plant-parasitic nematodes, compositions which contain the new thiadiazole derivatives as active ingredients.

Up to the present, only those active substances have attained great importance in controlling plant-parasitic nematodes living in the soil, which either act in the gaseous phase such as e.g. 1,2-dibromo-3-chloropropene and mixtures of dichloropropane and dichloropropene, or which are quickly decomposed in the soil such as e.g. the sodium salt of monomethyl dithiocarbamic acid or 3,5-dimethyl-tetrahydro-1,3,5-thiadiazine-2-thione.

The group of active ingredients first mentioned has the disadvantage that they have to be injected into the soil and therefore their use is complicated and expensive. The second group of active ingredients mentioned is unstable not only after application but also on previous storing and some of them can only be stored in the form of their aqueous solutions at concentrations which exclude their application as scattering agents. In addition, it is highly impracticable to use such agents for example in greenhouses or in the neighborhood of human dwellings because of their irritant action and their bad smell.

It is therefore an object of the present invention to provide nematocidally active substances and compositions containing the same which can be safely stored for prolonged periods in concentrated form, and which permit application to the soil by all conventional methods including particularly the use as scattering agent.

I have now found that this object and others that will become apparent in the description of the invention given hereinafter, are attained in the compounds of the formulas (I) 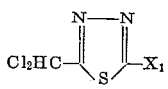

(II) 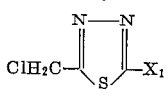

and (III) 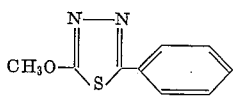

wherein $X_1$ represents lower alkylthio, lower alkoxy, alkenyloxy with from 3 to 4 carbon atoms or alkenylthio with from 3 to 4 carbon atoms, preferably allyloxy or allylthio, and "lower" in connection with the afore-mentioned aliphatic radicals meaning such radicals with from 1 to preferably up to 3, and not more than 4 carbon atoms.

(In the following specification and in the appended claims, "lower" in connection with aliphatic radicals has the same meaning unless expressly stated otherwise.)

The above-defined compounds are distinguished by very satisfactory nematocidal properties coupled with relatively weak or no phytotoxic activity, so that they are particularly well suited for combatting plant parasitic nematodes of the soil; they are used for example, in mixture with other substances as nematocidal compositions according to the invention, which are described in more detail further below.

That the above-described compounds of Formulas I to III have good nematocidal properties and can be handled in practical application, is particularly surprising since closely related compounds of the formula

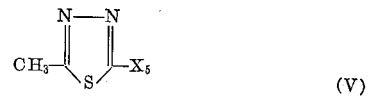 (V)

wherein $X_5$ represents lower alkoxy or lower alkylthio, possess no practically useful nematocidal activity, while the compound of the formula

 (VI)

has such highly irritating effect on the skin and on mucous membranes of humans that its application for agricultural purposes such as the combatting of nematodes of the soil is excluded.

The above-described compounds of Formulas I to III and other compounds which fall under the general formula

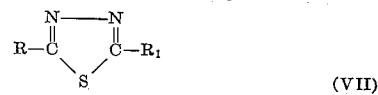 (VII)

wherein R represents an alkyl, alkoxy or alkylthio radical with from 1 to 12 carbon atoms, an alkenyl, alkenyloxy or alkenylthio radical with from 3 to 4 carbon atoms, and $R_1$ represents the methyl, chloromethyl, dichloromethyl or phenyl radical, are produced by treating a compound of the general formula

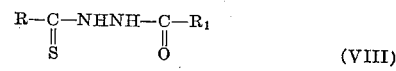 (VIII)

wherein R and $R_1$ have the meanings given above, with dehydrolyzing agents. Such dehydrolyzing agents are mainly thionyl chloride, phosphorus oxychloride, phosphorus pentachloride, phosphorus pentoxide, polyphosphoric acids and also sulfuric acid. When using, for example, phosphorus halides and thionyl chloride, the reaction temperature lies preferably between 70 and 150° C. When sulfuric acid is used as dehydrolyzing agent the reaction temperature is preferably maintained between —10 and +25° C.

The compounds of Formula II in which $X_1$ is alkylthio or alkenylthio are obtained according to a first variation of the process of the invention by treating a compound of the general formula

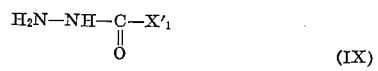 (IX)

wherein $X'_1$ is alkylthio or alkenylthio, with chloroacetyl chloride in benzene at the boiling temperature, or in a second variation by heating the corresponding starting material of the Formula VIII in vacuo at elevated temperatures preferably 70° to 100° C.

The following non-limitative examples illustrate the invention further. Parts and percentages are given therein by weight unless stated otherwise; and the relationship of parts by weight to parts by volume is as that of grams to cubic centimeters. The temperatures are in degrees centigrade. Pressures are given in torr (=mm. Hg).

EXAMPLE 1

182.5 parts of N'-chloroacetyl thiocarbazic acid-O-methyl ester (M.P. 147–148°) are added at —5° to 5° in small portions as quickly as possible to 200 parts by volume of concentrated sulfuric acid. The whole is stirred for 1 hour at 0° and then poured onto 400 parts of ice. The oil which separates is dissolved in ether. After drying and distilling off the ether, 2-methoxy-5-chloromethyl-1,3,4-thiadiazole is obtained. It distills at 75–77°/0.1 torr and solidifies in crystalline form; M.P. about 36°.

EXAMPLE 2

400 parts of N'-chloroacetyl-dithiocarbazic acid methyl ester (crude, oily) are heated for 3 hours at 75° under water jet vacuum. While still warm, the oily product is poured while stirring into 500 parts by volume of an aqueous about 10% sodium bicarbonate solution. A crystalline precipitate forms which is filtered off and recrystallized from methanol. The 2-methylthio-5-chloromethyl-1,3,4-thiadiazole thus obtained melts at 70–71°.

EXAMPLE 3

2-ethoxy-5-chloromethyl-1,3,4-thiadiazole is obtained analogously to Example 1 from 197 parts of N'-chloroacetyl-thiocarbazic acid-O-ethyl ester (M.P. 133–134°) and 400 parts by volume of concentrated sulfuric acid. It boils at 71–72°/0.015 torr.

EXAMPLE 4

87 parts of N'-dichloroacetyl thiocarbazic acid-O-methyl ester (M.P. 128–129°) are added at room temperature to 100 parts by volume of pure, concentrated sulfuric acid. The clear solution is stirred for 1 hour at room temperature and then poured onto 250 parts of ice. The product which precipitates in crystalline form is filtered off and carefully recrystallized from methanol/water. The 2-methoxy-5-dichloromethyl-1,3,4-thiadiazole so obtained melts at 35–36°.

EXAMPLE 5

150 parts of N'-dichloroacetyl dithiocarbazic acid ethyl ester (M.P. 133–134°) are added at 0–10° to 300 parts by volume of pure, concentrated sulfuric acid. The clear solution is stirred for 1 hour at room temperature and is then poured onto 900 parts of ice. The crystalline product is filtered off and carefully recrystallized from methanol/water. The 2-ethylthio-5-dichloromethyl-1,3,4-thiadiazole so obtained melts at 38–40°.

EXAMPLE 6

24 parts of dithiocarbazic acid methyl ester are suspended in 150 parts by volume of abs. benzene. 25 parts of chloroacetyl chloride are quickly added dropwise whereupon the temperature rises to 30–35° and a precipitate is formed. The mixture is vigorously refluxed for 1 hour while removing water; 3 parts of water are collected. The solution, which is now clear, is evaporated to dryness and the residue is recrystallized from methanol. The 2-methylthio-5-chloromethyl-1,3,4-thiadiazole so obtained melts at 70–71° and is identical to the product described in Example 2.

EXAMPLE 7

136 parts of dithiocarbazic acid ethyl ester are dissolved in 750 parts by volume of abs. benzene. 125 parts of chloroacetyl chloride are quickly added dropwise while gently cooling so that the temperature is kept between 10 and 35°. The mixture is then warmed and finally refluxed for 1 hour while removing water; 16 parts of water can be collected. The benzene solution is then cooled to room temperature, washed with sodium bicarbonate solution and water and dried over sodium sulfate. After distilling off the benzene, an oily residue remains which is distilled under high vacuum. 2-ethylthio-5-chloromethyl-1,3,4-thiadiazole is obtained as a colourless oil which distills at 91–92° under 0.05 mm. Hg pressure.

2-isopropylthio-5-chloromethyl-1,3,4-thiadiazole is obtained in an analogous manner from 150 parts of dithiocarbazic acid isopropyl ester. It is a colourless oil which distills at 105–107° under 0.02 mm. pressure.

2-allylthio-5-chloromethyl-1,3,4-thiadiazole is obtained in an analogous manner from 148 parts of dithiocarbazic acid allyl ester. It is a pale yellow oil which distills at 102–103° under 0.01 mm. pressure.

Further compounds falling under Formula VII, the structural elements R and $R_1$ are listed in the following table, have been prepared according to the preceding examples using equimolar amounts of the correspondingly substituted starting materials.

| No. | R | $R_1$ |
|---|---|---|
| 8 | —OCH$_3$ |  |
| 9 | —SCH$_3$ | —CHCl$_2$ |
| 10 | —OC$_2$H$_5$ | —CHCl$_2$ |
| 11 | —S-iso C$_3$H$_7$ | —CHCl$_2$ |
| 12 | —S-iso C$_3$H$_7$ |  |
| 13 | —SC$_2$H$_5$ | —CH$_3$ |
| 14 | —S-n-C$_{12}$H$_{25}$ | —CHCl$_2$ |
| 15 | —O—CH$_2$—CH=CH$_2$ | —CHCl$_2$ |
| 16 | —S—CH$_2$—CH=CH$_2$ | —CHCl$_2$ |
| 17 | —O—CH$_2$—CH=CH$_2$ | —CH$_2$Cl |

The new compounds can be used as the active agent for combatting nematodes either alone or in mixture with agricultural carriers in solid form, for instance, as finely powdered scattering agent or as granulates, or they can be used in liquid form as an emulsion, suspension or solution. In compositions, the content of the active ingredient may vary widely, from about 2 to 90% by weight. The choice of the form in which the nematocidal compounds according to the invention and the compositions containing the same are used depends on the intended method of application which, in its turn, depends on the type of nematodes to be controlled, the plants to be protected, the climate, and soil conditions as well as on the agricultural apparatus available. An even distribution of the active ingredient over the area to be controlled throughout a layer of soil about 15 to 25 cm. deep is generally advantageous, the amount of active substance thus necessary being, in general, about 20 to 600 and, preferably, 50 to 250 kg./hectare (corresponding to 10 to 300 milligrams of active substance per liter of soil in 20 cm. depth). On the other hand, a discontinuous, more localized application is possible, for example, one limited to dibble holes or seed furrows, whereby a sufficient protective action can often be attained with a lesser amount of active substance.

Nematocidally active dusts according to the invention can be produced on the one hand by mixing or grinding together the active substances in amounts of preferably 0.5 to 10%, based on the weight of the dust with a solid, pulverulent water-insoluble or sparingly water-soluble carrier substance, which does not react with the compounds of the aforesaid formulas. As such can be used, for example, preferably talcum, diatomaceous earth, limestone or chalk, also kaolin (china clay), bentonite, calcium carbonate, boric acid or tricalcium phosphate. On the other hand, the active substances may also be applied in a coating on the particles of carrier substances by means of a volatile solvent, to produce strewing agents and granulated compositions, either coarse-grained carrier substances and/or fine-grained carrier substances of greater density may be used such as fairly coarsely ground limestone, sand or loess or mixtures of active substance with finer-grained possibly porous carrier substances may be granulated. Such strewing agents should contain from about 1 to 20% of active substance according to the invention.

In addition, strewing agents may also contain as carriers substances in coarsely grained form or solid substances of greater solubility in water or ammonium citrate, for example, synthetic fertilizers such as solubilized calcium phosphates or other calcium, potassium or ammonium salts, in particular phosphates or nitrates.

Emulsions may be applied both to unplanted land or, owing to their power of penetration, in existing plant cultivations. For their preparation the active substances, after dissolving in agricultural organic solvents, non-reactive with said substances, such as xylene or dimethyl-formamide may be emulsified in water which contains a surface active substance. In the use of emulsions, it is usually advantageous in practice first to prepare concentrates by combination of active substance in amounts of about 30 to 70%, and preferably 50%, based on the weight of the resulting concentrate, with inert organic solvents and preferably with about 3 to 20% of surface active substances, preferably non-ionogenic or mixed non-ionogenic and anionic emulsifying agents which, in their turn, are mono- or poly-phase systems, and can be worked up with water to form ready-for-use emulsions. As surface active substances such as quaternary ammonium salts, anion active substances such as salts of aliphatic, long-chain sulfuric acid monoesters, long-chain alkoxy-acetic acids and aliphatic-aromatic sulfonic acids, and non-ionogenic substances, e.g. polyethylene glycol ethers of fatty alcohols or of dialkyl phenols and polycondensation products of ethylene oxide, as well as amphoteric substances can be employed. Suitable solvents for the production of emulsion concentrates are e.g. monocyclic aromatic hydrocarbons such as benzene, toluene, xylene; ketones; alcohols and other solvents such as ethyl acetate, dioxan, acetone, glycerin or diacetone alcohol.

Suspensions can be obtained by suspending moist active substances in water which optionally contains a surface active substance, or by suspending in water wettable powders which, in their turn, are prepared by mixing 10 to 80%, and preferably 50 to 75%, based on the weight of the powders of solid active substances according to the invention with preferably about 5 to 25% of solid pulverulent carriers and preferably 1 to 10% of a wetting agent of the type described above, as well as, optionally, 1 to 5% of a dispersing agent such as solid sulfite liquor.

As solvents for the active substances according to the invention, in particular halogenated aliphatic hydrocarbons having themselves a nematocidal action are employed, for example, 1,2-dibromo-3-chloropropene, di-chlorobutene, or mixtures of di-chloropropane and di-chloropropene, the instantaneous nematocidal action of which is broadened in a valuable way by that of the active substances according to the invention.

In the amounts employed in practice, the compounds according to the invention have practically no phytotoxic action so that there is no injurious effect on plant growth. If desired, the biological activity of the agents according to the invention can be broadened by the addition of fungicidally, herbicidally, or insecticidally active substances.

The compounds and compositions according to the invention are particularly effective in the control of such nematodes as:
Meloidogyne species
*Panagrellus redivivus*
*Rhabditis longispina*
Pratylenchus species
Ditylenchus species In the following a number of non-limitative examples are given which illustrate typical forms of application as well as one example illustrating the test method used for determination of the nematocidal activity of compounds according to the invention. Parts and percentages are given by weight unless stated otherwise.

*Example I*

75 parts of 2-methoxy-5-chloromethyl-1,3,4-thiadiazole are mixed with 2 to 4 parts of a wetting agent, e.g. the sodium salt of an alkyl $(OC_2H_4)_n$ monosulfate, wherein alkyl has an average carbon number of 16 and $n$ ranges from 2 to 3, 1 to 3 parts of a dispersing agent, e.g. solid sulphite waste liquor, and 15 parts of an inert solid carrier such as e.g. precipitated silicic acid (Aerosil) [Roempp, Chemie Lexikon, p. 54 (1958)] and then the mixture is finely ground in a pin mill until 95% of the material passes a 74 micron sieve. The wettable powder obtained is stirred with water and produces a very stable nematocidal suspension. Similar results are obtained when using calcium silicate (microcell) instead of Aerosil.

*Example II*

5 parts of 2-ethoxy-5-chloromethyl-1,3,4-thiadiazole are blended with 95 parts of sand as carrier, and the whole is moistened with 1 to 5 parts of water or iso-propanol and mixed to coat the sand particles with the resulting mixture. The product is used as nematocidal strewing agent.

*Example III*

10 parts of 2-ethylthio-5-dichloromethyl-1,3,4-thiadiazole, and 90 parts of calcium carbonate, are ground together in a pin mill and then blended with e.g. 100 to 900 parts of ammonium sulfate, as water-soluble synthetic fertilizer. The resulting mixture is ready for use as nematocidal fertilizer.

*Example IV*

5 parts of 2-methylthio-5-chloromethyl-1,3,4-thiadiazole and 80 parts of talcum are milled in a micropulverizer. The mixture obtained serves as nematocidal dust.

*Example V*

The active substance to be tested is worked up with polyoxyethylene sorbitan mono-oleate and acetone into an emulsifiable solution, 5 ml. thereof are emulsified with 15 ml. water and to the emulsion is added 1 liter of soil which is infected with meloidogyne arenaria. After 7 days, the soil is filled into three plantpots and 10 tomato seedings are then planted in each pot. After 5 weeks, the nodules formed on the roots of the plants are counted and the weight of the plants is determined.

Average per pot containing 10 plants:

| | 3-methylthio-5-chloromethyl-1,3,4-thiadiazole in mg. per litre earth (p.p.m.) | | | Controls |
|---|---|---|---|---|
| | 25 | 50 | 100 | |
| Number of root nodules in percent of controls | 4 | 0 | 0 | 100 |
| Weight of plant in percent of controls | 108 | 104 | 94 | 100 |

*Example VI*

10 parts of 2-ethoxy-5-chloromethyl-1,3,4-thiadiazole dissolved in 80 parts of dimethyl formamide and 10 parts of condensation product of nonylphenol and ethylene oxide (molar ratio 1:8 to 1:9) are mixed with this solution until homogeneity is attained. In this way, an emulsifiable solution is obtained which can be diluted with water to any concentration desired.

I claim:
1. A compound of the formula

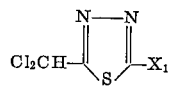

wherein $X_1$ is a member selected from the group consisting of lower alkylthio, lower alkoxy, alkenyloxy with from 3 to 4 carbon atoms and alkenylthio with from 3 to 4 carbon atoms.

2. A compound of the formula

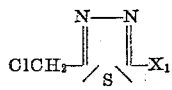

wherein $X_1$ is a member selected from the group consisting of lower alkylthio, lower alkoxy, alkenyloxy with from 3 to 4 carbon atoms and alkenylthio with from 3 to 4 carbon atoms.

3. A compound of the formula

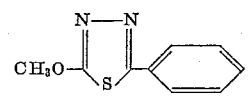

References Cited by the Examiner
UNITED STATES PATENTS 3,192,103  6/1965  Sousa et al. _____ 260—307.7

ALEX MAZEL, *Primary Examiner.*
R. J. GALLAGHER, *Assistant Examiner.*